United States Patent [19]
Grose et al.

[11] Patent Number: 6,141,776
[45] Date of Patent: Oct. 31, 2000

[54] DATA-DRIVEN PROCESS GENERATOR

[75] Inventors: David Lee Grose, Poulsbo; David Dicken Redhed, Seattle, both of Wash.

[73] Assignee: The Boeing Company, Seattle, Wash.

[21] Appl. No.: 09/070,115

[22] Filed: Apr. 29, 1998

[51] Int. Cl.[7] .................................................. G06F 11/00
[52] U.S. Cl. .................................. 714/37; 714/39; 717/7; 717/9; 712/241
[58] Field of Search .................................. 714/37, 36, 38, 714/39, 48, 50, 746, 758, 791; 717/5, 6, 7, 8, 9; 712/241; 395/707, 708, 709, 712

[56] References Cited

U.S. PATENT DOCUMENTS

| | | | |
|---|---|---|---|
| 5,584,027 | 12/1996 | Smith | 717/7 |
| 5,706,355 | 1/1998 | Raboisson et al. | 382/104 |
| 5,751,982 | 5/1998 | Morley | 395/800 |
| 5,790,778 | 8/1998 | Bush et al. | 714/38 |
| 6,029,002 | 2/2000 | Afifi et al. | 717/7 |
| 6,035,123 | 3/2000 | Razdan et al. | 717/9 |

OTHER PUBLICATIONS

Donald V. Steward, *Introduction to The Problem Solving Enterprise*, Revision of paper presented at the Reengineering Forum, Victoria, B.C., Sep. 1994.

Donald V. Steward, *On an Approach to Techniques for the Analysis of the Structure of Large Systems of Equations*, Stanford University Graduate Paper, Oct. 1961.

Donald V. Steward, "Organizing the Design of Large Systems Using Partitioning and Tearing," *Proceedings of the Third Hawaii International Conference on Sytem Sciences*, Honolulu, Hawaii, Jan. 1970.

Donald V. Steward, Organizing the Design of Systems by Partitioning and Tearing, *DMG Newsletter*/Design Methods Group, vol. 4, No. 2, Feb. 1970.

"Partitioning and Tearing Systems of Equations," Donald V. Steward, pp. 349–365.

Donald V. Steward, "Partitioning and Tearing Large Systems of Equations," *System Theory*, Microwave Research Institute Symposia Series, vol. XV, Polytechnic Press, Brooklyn, New York, Apr. 1965, pp. 89–93.

Donald V. Steward, "Planning and Managing the Design of Systems," California State University, Sacramento, California.

Donald V. Steward, "Re–engineering the Design Process," California State University, Sacramento, California.

Donald V. Steward, *Systems Analysis and Management: Structure, Strategy and Design*, TAB Books, Blue Ridge Summit, Pennsylvania, 1997.

(List continued on next page.)

*Primary Examiner*—Robert W. Beausoliel, Jr.
*Assistant Examiner*—Pierre Eddy Elisca
*Attorney, Agent, or Firm*—Christensen O'Connor Johnson Kindness PLLC

[57] ABSTRACT

A method of analyzing process steps and creating a data-driven process is disclosed. A data-driven process is a process that has its steps sequenced according to data relationships among the process steps, and the rule that a step is placed in the sequence only when all of its inputs exist. A data-driven process can only be created when all steps may be placed in the sequence according to this rule. The method determines if a process is data-driven by checking to see if any of the individual steps causes one or more errors which would prevent data-driven sequencing, and, if any errors are found, error correction is attempted in order to create a data-driven process.

17 Claims, 9 Drawing Sheets

OTHER PUBLICATIONS

Donald V. Steward, "The Analysis of the Structure of Systems," University of Wisconsin Graduate Paper, 1973.

Donald V. Steward, "The Design Structure System: A Method for Managing the Design of Complex Systems," *IEEE Transactions on Engineering Management,* vol. EM–28, No. 3, Aug. 1981, pp. 71–74.

Donald V. Steward, *The Problem Solving Enterprise: Welcome to Problematics,* 1996.

Donald V. Steward et al., "The Problem Solving Enterprise: Using Dependency Structure and Situation Visibility to Solve Problems and Realize Business Opportunities," *Problematics,* 1998.

Donald V. Steward, "Using the Design Structure Method," *NSF Report,* California State University, Sacramento, California, Aug. 1993.

"A Knowledge–Based Tool for Multilevel Decomposition of a Complex Design Problem," James L. Rogers, NASA Technical Paper 2903, 1989.

"A Method for Systems Design Using Precedence Relationships: An Application to Automotive Brake Systems," Thomas A. Black et al., Working Paper, Massachusetts Institute of Technology, May 1990.

"Dependency Structure Matrix–Based Systems Engineering, Organization Planning, and Schedule Management," Tyson Rodgers Browning, Massachusetts Institute of Technology, Mar. 1995, revised Feb. 1998.

"Systematic IPT Integration in Lean Development Programs," Tyson Rodgers Browning, The Lean Aircraft Initiative Report Series, #RP97–01–19, Massachusetts Institute of Technology, Feb. 1997.

DATA-DRIVEN PROCESS GENERATOR

FIELD OF THE INVENTION

This invention relates to methods of analyzing processes to see if they are or can be data-driven and resequencing processes that can be data-driven to ensure that they are data-driven.

BACKGROUND OF THE INVENTION

In the development of large scale complex systems, such as commercial airliners, many hundreds or thousands of individual process steps or decisions must be made between the initial concept and the delivery of a finished product. Many of these process steps and decisions rely on data from other process steps and decisions. For efficiency reasons, it is important to schedule these individual process steps and decisions such that the amount of time wasted in waiting for data is minimized.

Many business processes are the result of manual development methodologies that are not suited to large scale, cross-functional and iterative business processes. These methodologies are typically based on experience and history and often result in an ad-hoc sequencing of process steps irrespective of data dependencies, interrelationships and quality. This often results in process steps being specified for execution in out-of-sequence order. An out-of sequence process step is one that is executed before all of its required inputs from other steps in the process are available. When process steps are executed out-of sequence, the missing data inputs are supplied from sources other than the responsible source. The effects of out-of-sequence process steps are schedule delays due to incorrect data or the continuation of the process with incorrect or stale data. Out-of-sequence process steps therefore requires a rework effort to correct the data.

SUMMARY OF THE INVENTION

An interest-in "preferred processes" has led to the recognition that data-oriented process development methodologies yield a more efficient business model than process step-oriented methodologies. Data-driven processes are those that are sequenced according to data relationships among the process steps. All the data required by each process step, therefore, must be available before the process step is placed in the process sequence. Conversely stated, no process step in a business process is initiated before all of the step's required data inputs are available.

In accordance with this invention, a method of analyzing process steps and based thereon creating a data-driven process is provided. A data-driven process is a process that has its steps sequenced according to the rule that a step is placed in the sequence only when all of its inputs exist. A data-driven process can only be created when all steps may be placed in the sequence according to this rule.

According to one aspect of the present invention, the method determines if a process is data-driven by checking to see if any of the individual steps cause an error.

According to another aspect of the present invention, if any errors are found, error correction is attempted in order to create a data-driven process by changing the sequence of steps or requiring modification of data relationships between steps to permit data sequencing.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to a method of analyzing processes to determine whether or not they are data-driven, and to re-sequence processes so that they are data-driven, if possible.

Figure 1:
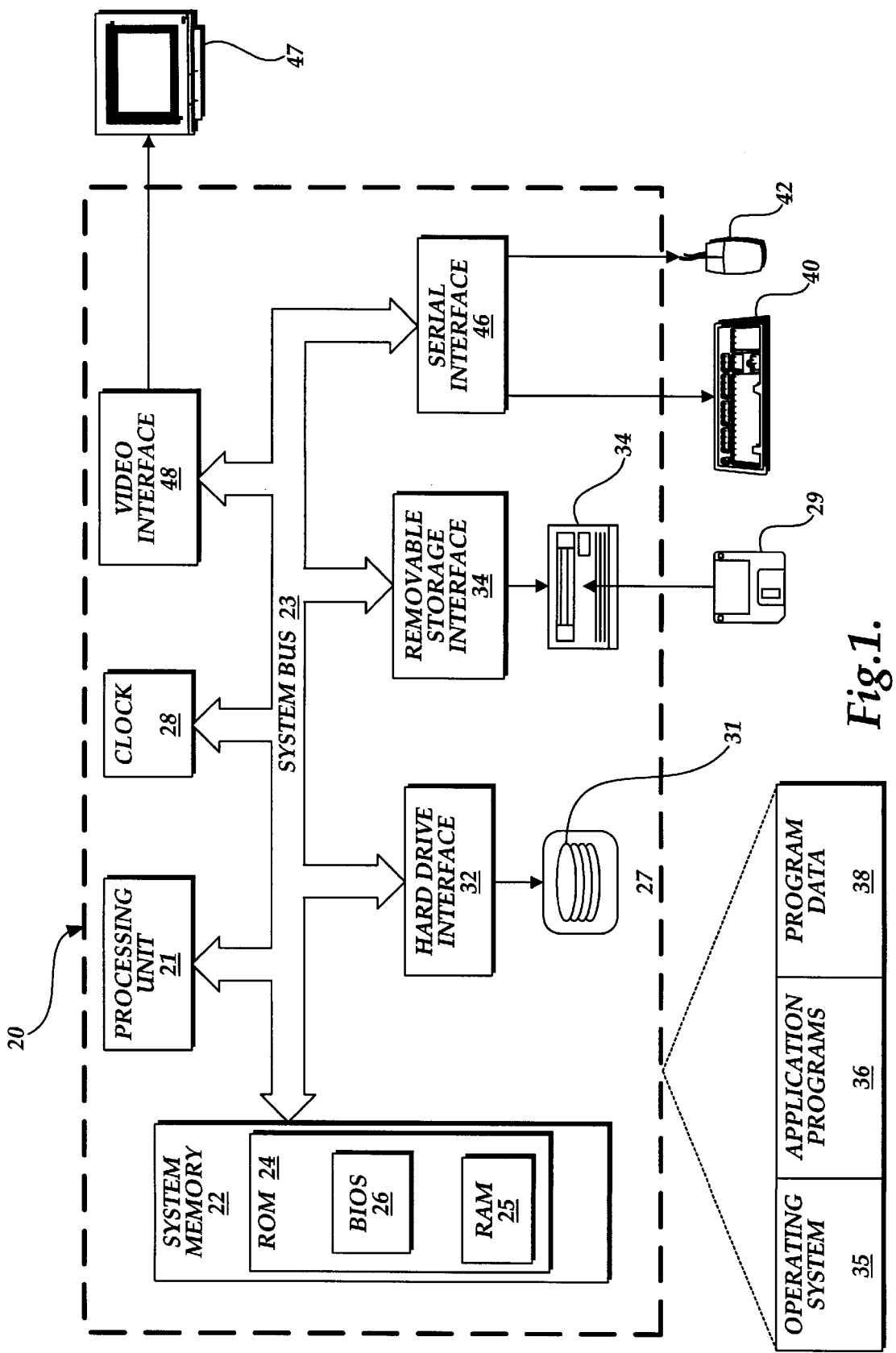
FIG. 1 is a diagram depicting an exemplary environment in which the present invention operates.

The method of the present invention executes on a computer, such as a general purpose personal computer. FIG. 1 and the following discussion are intended to provide a brief, general description of a suitable computing environment in which the invention may be implemented. Although not required, the invention will generally be implemented as computer-executable instructions, such as program modules, being executed by a personal computer. Generally, program modules include routines, programs, objects, components, data structures, etc. that perform particular tasks or implement particular abstract data types. Those skilled in the art will appreciate that the invention also may be practiced on other computer system configurations, multiprocessor systems, minicomputers, and mainframe computers. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device such as a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. System timing is provided by a clock signal (not shown) applied to the system bus 23. The system memory includes read only memory (ROM) 24 and random access memory (RAM) 25. A basic input/output system 26 (BIOS), containing the basic routines that helps to transfer information between elements within the personal computer 20, such as during startup, is stored in ROM 24. The personal computer 20 further includes storage devices such as a hard disk drive 27 connected to the system bus through a hard drive interface 32 for reading from and writing to a hard disk, not shown, and one or more removable disk drives 30 connected to the system bus through one or more removable storage interfaces 34 for reading from or writing to storage 29, such as floppy disks, removable magnetic disks, CD-ROMs or other optical media. The drives and their associated computer-readable media provide nonvolatile storage of computer readable instructions, data structures, program modules and other data for the personal computer 20. Although the exemplary environment described herein employs a hard disk and removable media, it should be appreciated by those skilled in the art that other types of computer-readable media which can store data that is accessible by a computer, such as magnetic cassettes, flash memory cards, digital versatile disks (also known as Digital Video Disks or DVDs), Bernoulli cartridges, random access memories (RAMs), read only memories (ROMs), and the like, may also be used in the exemplary operating environment.

A number of program modules may be stored on the storage devices, including an operating system 35, one or more application programs 36, and program data 38. A user may enter commands and information into the personal computer 20 through input devices such as a keyboard 40 and a pointing device 42. Other input devices (not shown) may include a microphone, joystick, scanner, or the like. These and other input devices are often connected to the processing unit 21 through a serial interface 46 that is coupled to the system bus, but may be connected by other interfaces, such as a parallel port or a universal serial bus (USB). A display device 47, such as a monitor, is also connected to the system bus 23 via a video interface 48. In addition to the monitor, personal computers typically include other peripheral output devices (not shown), such as printers and plotters.

The present invention analyzes process steps for errors that will prevent datadriven sequencing, and attempts to correct the errors so that a data-driven sequence results. Errors that will prevent data-driven sequencing appear in Table 1, below.

TABLE 1

| Error #1 | Pass-Through Data Items | Data items that are both an input and an output will prevent data-driven sequencing. |
|---|---|---|
| Error #2 | Redundant Data Generation | Two or more process steps having a particular data item in their lists of outputs or initial outputs will prevent data-driven sequencing. |
| Error #3 | Tight-Loop Iteration | Two steps that feed each other, will prevent data-driven sequencing. This occurs when Step A has an output that is an input of Step B, and Step B has an output that is an input of Step A. |
| Error #4 | Connected Iteration | A single step located at the end of one iteration loop and also at the start of another iteration loop will prevent data-driven sequencing. |
| Error #5 | Non-Converging Iteration | An iteration loop between two steps constructed such that it is not possible for any data to flow between the step at the start of the loop and the step at the end of the loop data-driven sequencing. The data does not have to flow directly between the two steps. The data may involve other steps. |
| Error #6 | Inconsistent Iteration | A step at the end of an iteration loop having output data items that appear in the list of inputs of the step at the start of the iteration loop will prevent data-driven sequencing. |

TABLE 1-continued

| Error #7 | Incomplete Iteration | A step having a data item in its list of initial inputs that does not appear in the list of outputs of any step in the process will prevent data-driven sequencing. |
|---|---|---|

Error checking according to the preferred embodiment of the present invention is divided into two phases: a pre-sequencing phase during which the system analyzes for Errors 1–3; and a post-sequencing phase during which the system analyzes for Errors 4–7. Each of the two phases is followed by a sequencing phase of operation. After the pre-sequencing phase, a trial data-driven sequence is created so that the system running an embodiment of the invention can check for Errors 4–7. During this trial sequencing, the system also checks for an additional error, the Implied Iteration, which will be discussed more fully below. Final sequencing is performed after post-sequencing error processing to create a final data-driven process. The four phases of operation are described more fully in the following discussion.

Figure 2A:
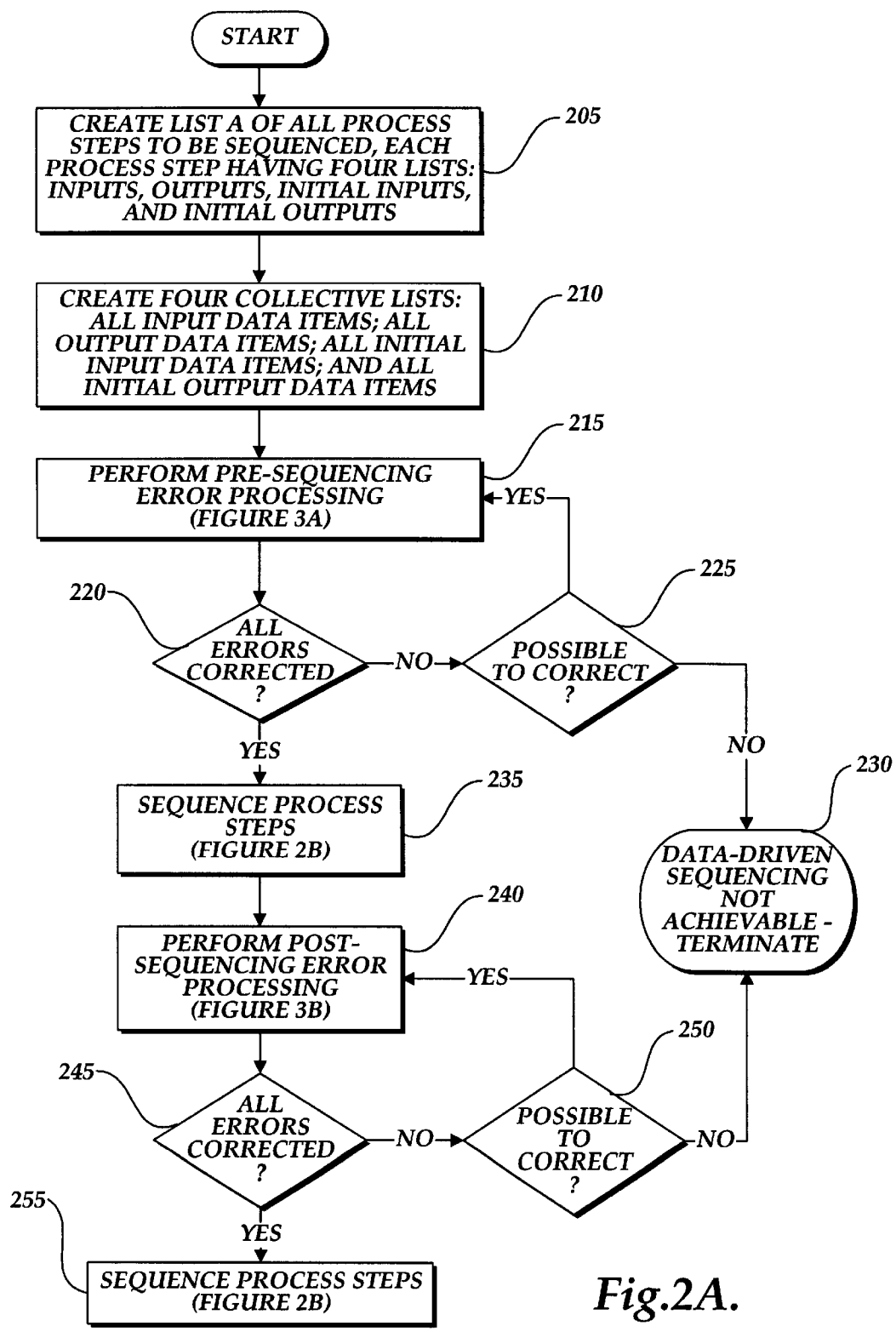
FIG. 2A is a flow diagram depicting an overall method of operation according to the present invention.

FIG. 2A is a functional flow diagram illustrating in a general way how a computer system is programmed according to the invention to analyze processes to determine if they are data-driven and to resequence processes that are not data-driven so that they become data-driven, if possible. The program begins, at block 205, by creating a list, designated List A, of all process steps in a sequence to be analyzed. Each of the process steps in a sequence to be analyzed has four associated lists: an INPUTS list containing the names of data items that are used by the process step as input data; an INITIAL INPUTS list containing the names of data items that are used by the step as initial values in an iteration loop; an OUTPUTS list containing names of data items which are created by the process step; and an INITIAL OUTPUTS list containing the names of data items that are created by the process step and used by other process steps as initial inputs.

At block 210, four collective lists are created: a list containing all data items that are inputs to process steps; a list containing all data items that are outputs of process steps; a list of all data items that are used as initial values in iteration loops; and a list of all data items that are initial outputs, i.e., a collective INPUTS list; a collective INITIAL INPUTS list; a collective OUTPUTS list; and a collective INITIAL OUTPUTS list. In a present embodiment of the invention, the collective lists of data items are maintained as unique lists; however, those skilled in the art will recognize that lists containing redundant data items could be employed without departing from the spirit of the invention. The creation of the collective lists can take place any time from during the creation of List A to the beginning of error processing or even not at all. The system of the present invention need not create four new, collective, lists, but could operate using the four lists of each individual step in List A.

Figure 3A:
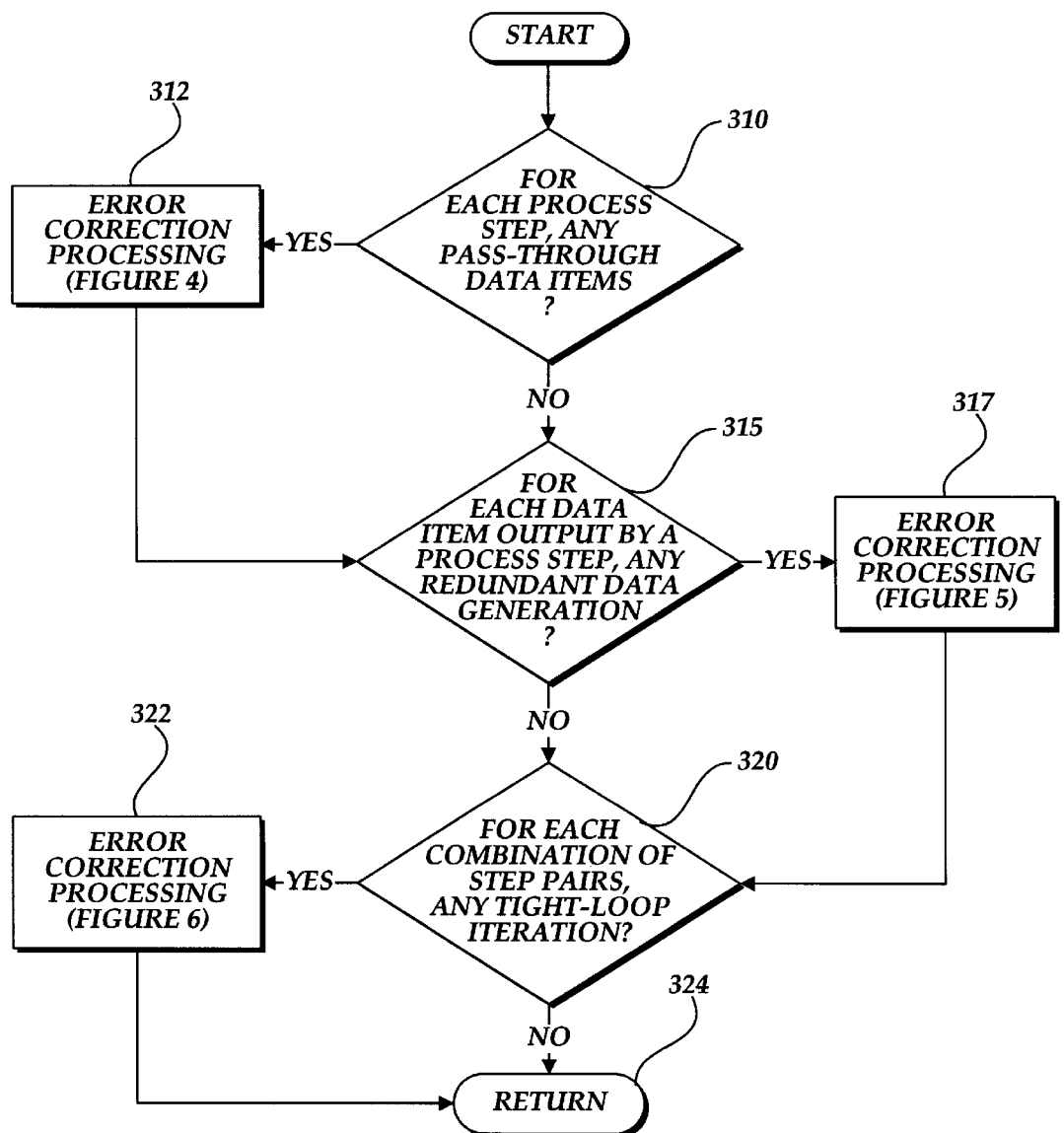
FIG. 3A is a flow diagram depicting a pre-sequencing error processing operation according to the present invention.

Pre-sequencing error processing is performed at block 215. Details of the pre-sequencing error processing are illustrated in FIG. 3A, and described below.

After pre-sequencing error processing has been performed, a check is made to determine whether all the errors of Types 1–3 (see Table 1) have been corrected. See block 220. If not, at block 225, a determination is made as to whether or not it is possible to correct those errors. This determination is generally made by a human user based on decision and determinations made by the user during the pre-sequencing error processing at block 215, but rule-based systems or other ways making of this determination could be employed without departing from the spirit of the invention. If it is determined, at block 225, that it is possible to correct the errors, then the pre-sequencing error processing steps at block 215 are repeated. This sequence reoccurs until either all Type 1–3 errors have been corrected, or it is determined that it is not possible to do so. If, at block 225, it is determined that it is not possible to correct all errors, the program determines that data-driven sequencing is not possible with the given information and system operation terminates. See block 230.

Figure 2B:
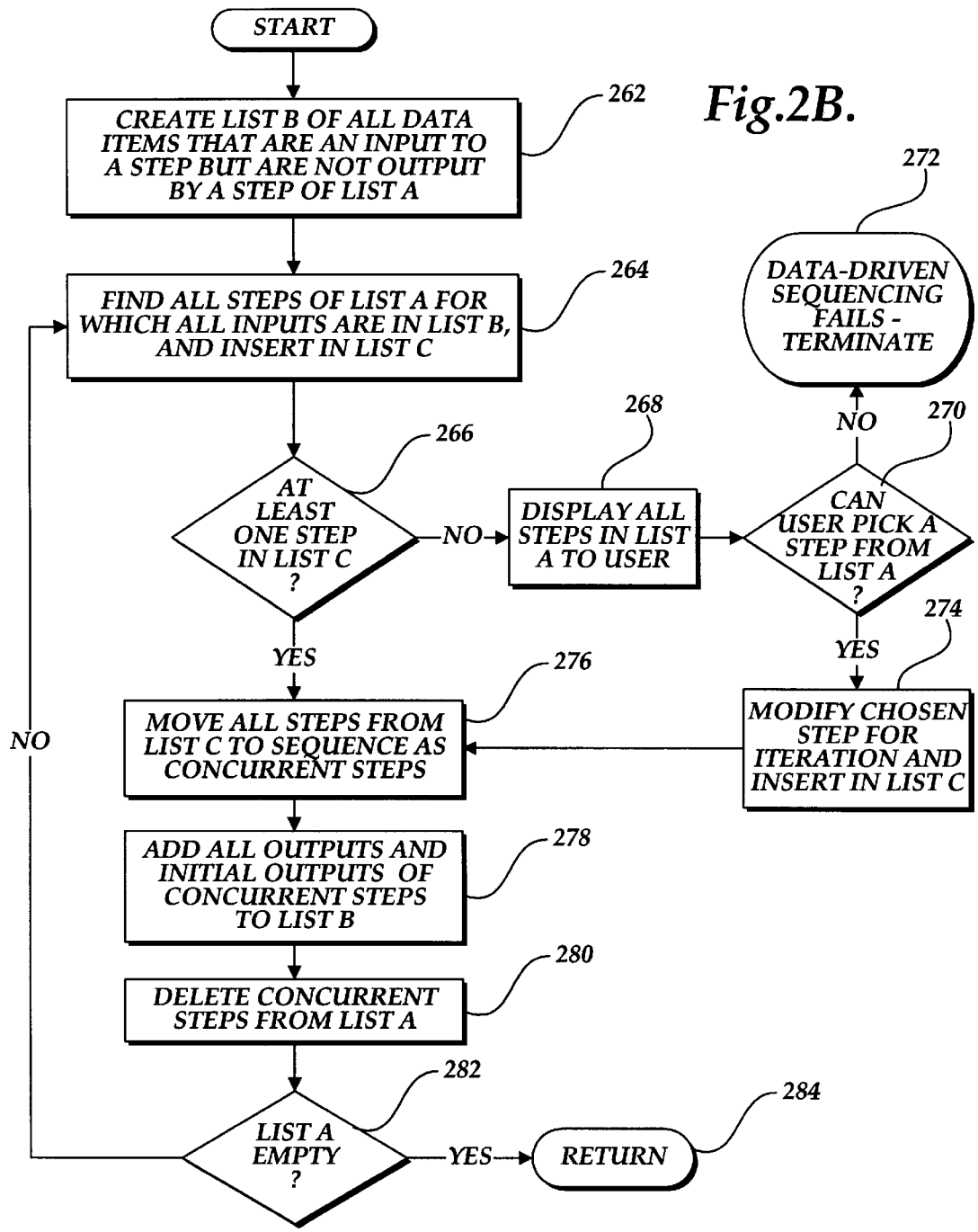
FIG. 2B is a flow diagram depicting a sequencing operation according to the present invention.

If, at block 220, it is determined that all Type 1–3 errors have been corrected, the program enters, at block 235, the process sequencing phase of operation. Since, at this stage, Errors 4–7 have not been addressed, only a trial data-driven sequence is created, rather than a final one. Details of the initial sequencing operation are illustrated in FIG. 2B, and described below.

Figure 3B:
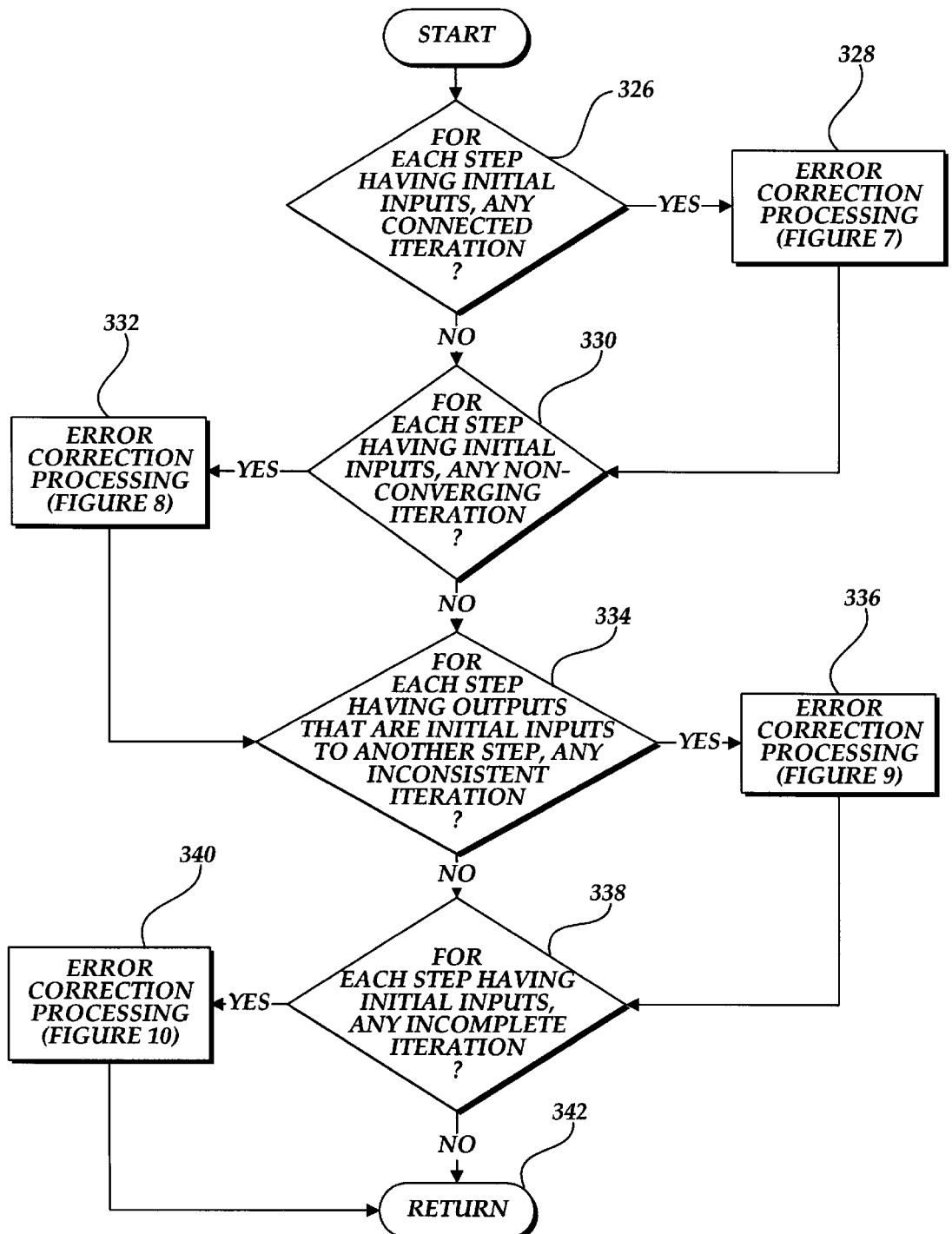
FIG. 3B is a flow diagram depicting a post-sequencing error processing operation according to the present invention.

After the trial data-driven sequence has been created, post-sequencing error processing is conducted. See block 240. Details of the post-sequencing error processing are illustrated in FIG. 3B, and described below.

After post-sequencing error processing has been performed, a check is made to determine whether all the errors of Types 4–7 (see Table 1) have been corrected. See block 245. If not, at block 250, a determination is made as to whether or not it is possible to correct those errors. As in the pre-sequencing phase, this determination is generally made by a human user, but other ways making of this determination could be employed without departing from the spirit of the invention. If it is determined, at block 245, that it is possible to correct the errors, then the pre-sequencing error processing steps at block 240 are repeated. This sequence reoccurs until either all Type 4–7 errors have been corrected, or it is determined that it is not possible to do so. If, at block 250, it is determined that it is not possible to correct all errors, the program determines that data-driven sequencing is not possible with the given information and system operation terminates. See block 230.

If, at block 245, it is determined that all Type 4–7 errors have been corrected, then final data-driven sequencing is performed. See block 255. Details of the final sequencing operation are illustrated in FIG. 2B, and described below.

As noted above, the pre-sequencing error processing performed at block 215 is depicted in FIG. 3A, which is described next. FIG. 3A is an overall flow of the pre-sequencing error processing performed at of block 215 in FIG. 2A. Pre-sequencing error processing is performed to detect and attempt to correct Errors 1–3 described in Table 1.

Figure 4:
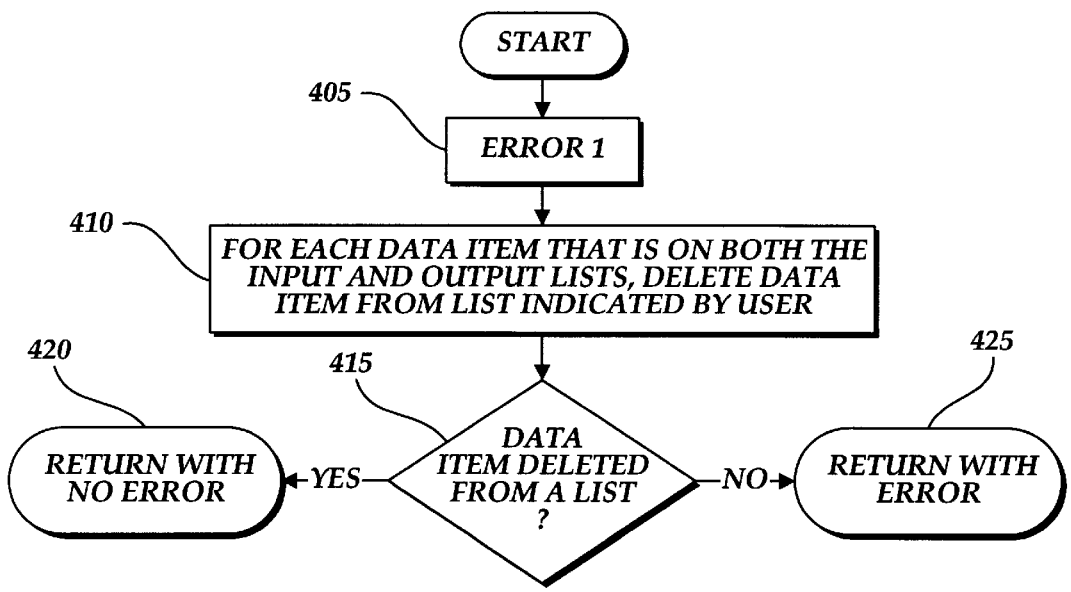
FIGS. 4–10 are flow diagrams depicting processing for specific errors according to the present invention.

Referring to FIG. 3A, at block 310, each process step in List A is checked for any pass-through data items. If a process step has outputs which are also inputs, the process step is said to have a pass-through data item. In a present embodiment of the invention, checking for pass-through data items is accomplished by performing an exclusive-OR (XOR) operation on the INPUTS and OUTPUTS lists for each process step. If the result from the XOR operation is other than a null or empty set, then pass-through data items have been detected. Those skilled in the art will readily appreciate that other methods of comparing the INPUTS and OUTPUTS lists may be used other than the exclusive-OR without departing from the spirit and scope of the invention. Since data items cannot be input to and output from the same process step, this situation results in a process that cannot be data driven if the situation is not corrected. In a present embodiment of the invention, all process steps are analyzed at block 310 prior to making a determination as to whether any pass-through data items are detected; however, those skilled in the art will recognize that each process step may be examined individually, entering the error correction procedure immediately upon detection of an error, such that for each error, detection and correction is an iterative process for each process step. If, at block 310, any pass-through data items were detected, error correction processing of FIG. 4 is initiated. See block 312.

Referring to FIG. 4, at block 405, the user is informed that Error 1 has been detected. The user is then presented with the data items that are on both the INPUTS and OUTPUTS lists of the process steps, so that the user can select a list from which to delete each data item. See block 410. The user may elect to delete a data item from the INPUTS list or the OUTPUTS list. If, at block 415, the user is able to choose a list from which to delete a data item from one list for each process step having a pass-through data item, processing returns with no error to block 312 of FIG. 3A. See block 420. If the user is unable to do so, or unwilling to make a decision at this time, then processing is returned with an error to block 312 of FIG. 3A. See block 425. Alternatively, the return with error could return to block 220 of FIG. 2A.

Returning to FIG. 3A, if at block 310, no pass-through data items were detected, or after a return from error correction processing at block 312, processing proceeds to block 315. At block 315 the process steps in List A are analyzed for redundant data generation. In a present embodiment of the invention, the collective OUTPUTS list is exclusive-ORed (XORed) with the OUTPUTS list of each process step to determine the process steps which generate each data item. If the analysis determines that a data item is generated by more than one process step, error correction processing of FIG. 5 is initiated.

Figure 5:
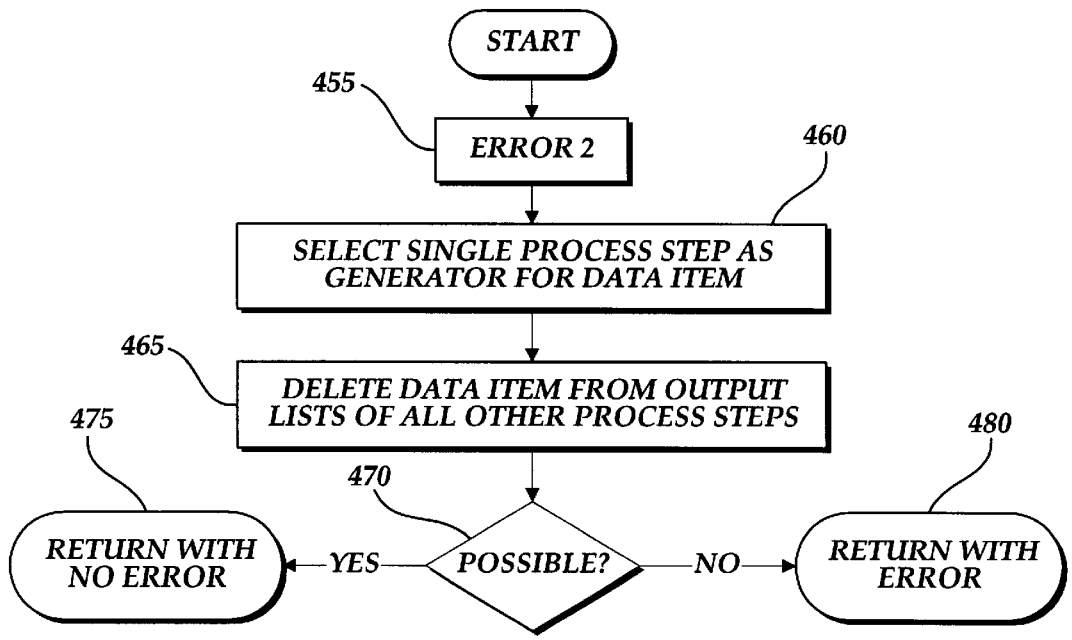

Referring to FIG. 5, first the user is informed that Error 2 has been detected. See block 455. The user is then presented with all the process steps which generate each particular data item, and asked to select a single process step to be the generator for the data item. See block 460. After the user has selected a single process step as a generator for each data item, at block 465, the data item is deleted from the OUTPUTS lists of all the other process steps.

If, at block 470, the user was able to select a single process step as a generator for each data item having more than one generator, processing returns with no error to block 317 in FIG. 3A. See block 475. If the user is unable to select a single process step as the generator for any data item, or is unwilling to make a decision at this time, processing returns with an error to block 317 in FIG. 3A. See block 480. Alternatively, the return with error could return to block 220 of FIG. 2A.

Returning to FIG. 3A, if, at block 315, no redundant data generation was detected, or after a return from error correction processing at block 317, processing proceeds to block 320. At block 320, each combination of process step pairs in List A is analyzed for any tight-loop iteration.

Tight-loop iteration is present when a first step (A) has input data items created by a second step (B) and step B has input data items created by step A, but no iteration has been specified, and the sequencing logic is unable to determine which of the two steps is to be executed first. In a present embodiment of the invention, each process step in List A is compared with every other process step. The INPUTS list of step A is exclusive-ORed with the OUTPUTS list of step B, and the OUTPUTS list of step A is exclusive-ORed with the INPUTS list of step B. If both exclusive-OR operations result in non-empty sets, then a tight-loop iteration has been detected.

This situation must be resolved by the user specifying whether step A precedes step B or the other way around. Once this decision is made, the data items being sent from the second step back to the first will be changed from input data items into initial input data items for the first step. When resolved in this way, the result is iteration between steps A and B.

Where three or more steps are involved, an implied iteration situation, similar to the tight-loop iteration may result. This will be detected during the sequencing of a process when none of the remaining process steps have all their inputs available, and no tight-loop iteration is present. Implied iteration will be discussed more in the description of the sequencing phase below.

This must be resolved by selecting one of the process steps as the one to execute first among the steps in the implied iteration. This has the effect of setting all unavailable inputs of that one step to initial inputs, and putting this step at the start of one or more iteration loops. When resolved in this way, iteration is the result.

Figure 6:
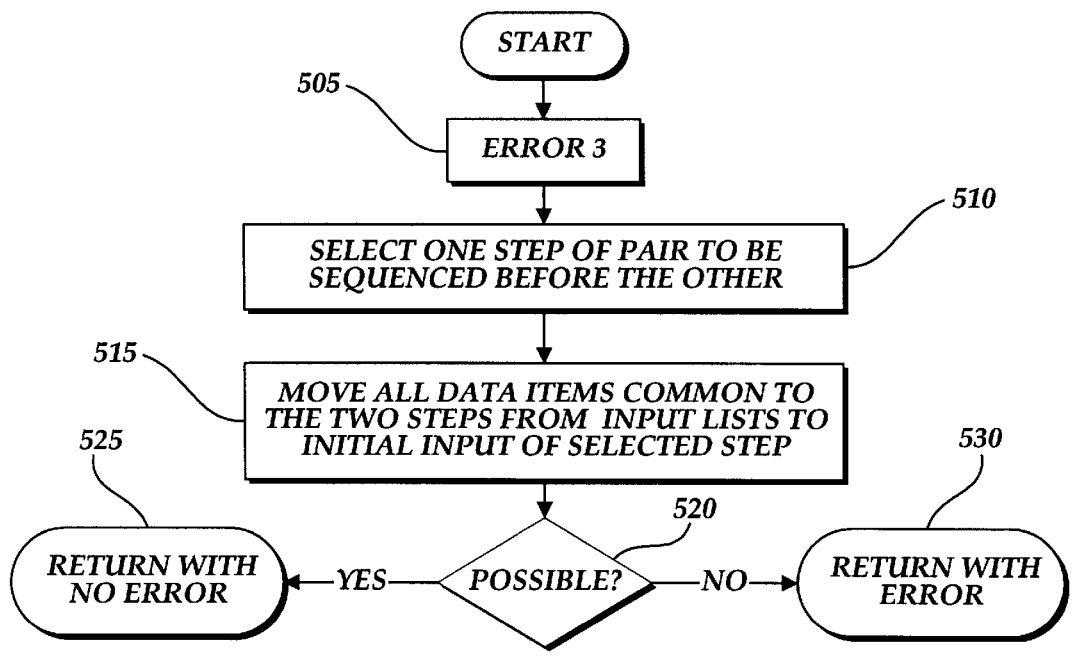

If, at block 320, tight-loop iteration is detected, the error correction processing shown in FIG. 6 is initiated. Referring to FIG. 6, the user is informed that Error 3 has been detected. See block 505. The user is then presented with the step pairs resulting in tight-loop iterations, and asked to select one step of each pair to be sequenced before the other. See block 510. After the user selects the step to be sequenced before the other, all data items which are input to the selected step and output from the other step are moved from the INPUTS list to the INITIAL INPUTS list of the selected step. See block 515.

If, at block 520, the user was able to select a step to be sequenced before the other, processing returns with no error to block 322 of FIG. 3A. See block 525. On the other hand, if the user was unable to choose a step, or was unwilling to make a decision at this time, at block 520, then at block 530, processing is returned with an error to block 322 at FIG. 3A. Alternatively, the return with error could return to block 220 of FIG. 2A.

Returning to FIG. 3A, if at block 320, no tight-loop iteration was detected, or after a Return from error correction processing at block 322, processing returns to block 215 of FIG. 2A.

While the illustrated embodiment of the invention processes for Errors 1–3 sequentially, it is to be understood that other processing orders could be used, and certain combinations of Errors 1–3 could be processed concurrently, without departing from the spirit and scope of the invention.

Returning to FIG. 2A, once all the pre-sequencing errors have been corrected, an initial trial sequencing phase, depicted in FIG. 2B, is entered at block 235.

Referring to FIG. 2B, during this initial sequencing phase of operation, a list, designated as List B, is created. See block 262. List B contains all data items which are an input to a process step in List A, but are not output by any process step in List A, i.e., data items which are included in an INPUTS list of a process step, but are not included in any OUTPUTS lists of any process steps are placed in List B.

Next, at block 264, another list, designated as List C, is created, if it has not already been created. List C is created by examining all the process steps in List A to locate those steps for which all input data items are in List B. These steps are placed in List C. Then, at block 266, List C is checked to see if there is at least one process step contained therein. If not, List A is displayed to the user at block 268, and the user is asked to choose a step from the list to be the next step of the process. If, at block 270, the user is unable to choose a process step to be the next step, then datadriven sequencing is deemed not possible, and the process will terminate. See block 272. At this stage of trial sequencing, an additional error, implied iteration, can be detected.

Implied iteration is similar to the Tight-Loop Iteration of Error 3, except that three or more steps are involved. This will be detected when none of the remaining process steps have their inputs available, but no Tight-Loop Iteration is present. For example, if only steps A, B and C remain to be sequenced, and step A has inputs generated by step C, step B has inputs generated by step A, and step C has inputs generated by step B, then an Implied Iteration is present.

Implied iteration must be resolved by selecting, at block 270, one of the process steps as the one to execute first among the steps in the implied iteration. This has the effect of setting all unavailable inputs of that one step to initial inputs, and putting this step at the start of one or more iteration loops. When resolved in this way, iteration is the result.

If, at block 270, the user can and does choose a step from List A to be the next step, the chosen step is modified to account for any iteration, as noted above, and then inserted in List C. See block 274. Modifying a step to account for iteration means that at least one input is changed to an initial input for that step.

If at least one process step was determined to be in List C at block 266, or after the modification for iteration and insertion of a process step into List C at block 274, all process steps from List C are moved to the trial data-driven sequence as concurrent steps, i.e., as steps which may be performed concurrently. See block 276.

At block 278, all the data items in the OUTPUTS and INITIAL OUTPUTS lists of the concurrent steps from List C are moved to List B. The concurrent steps are then deleted from List A, at block 280.

Next, at block 282, List A is examined to see if any process steps remain to be sequenced. If so, the trial data-driven sequencing phase is complete, and processing returns to block 240 of FIG. 2A. See block 284. If, at block 282, List A still contains steps to be sequenced, processing returns to block 264 and the steps from this point on are repeated.

Returning to FIG. 2A, after the trial data-driven sequence has been created, post-sequencing error processing is performed. See block 240. As noted above, the post-sequencing error processing performed at block 240 is depicted in FIG. 3B, which is described next. FIG. 3B is an overall flow of the post-sequencing error processing performed at of block 240 in FIG. 2A. Post-sequencing error processing is performed to detect and attempt to correct Errors 4–7 described in Table 1.

Referring. to FIG. 3B, after the trial data-driven sequence has been created, the sequenced steps are analyzed for Errors 4–7. Beginning at block 326, each step having data items in its INITIAL INPUTS list is analyzed for any connected iteration. A connected iteration is present when a single process step is at the end of one iteration loop and also at the beginning of another iteration loop. This typically occurs when process steps are modeled at a high level, disguising the fact that there are actually two steps inside of one process step. If the high level process step was shown as two steps, the iteration loops would no longer be connected. If connected iteration is detected at block 326, processing proceeds to the error correction processing depicted in FIG. 7. See block 328.

Figure 7:
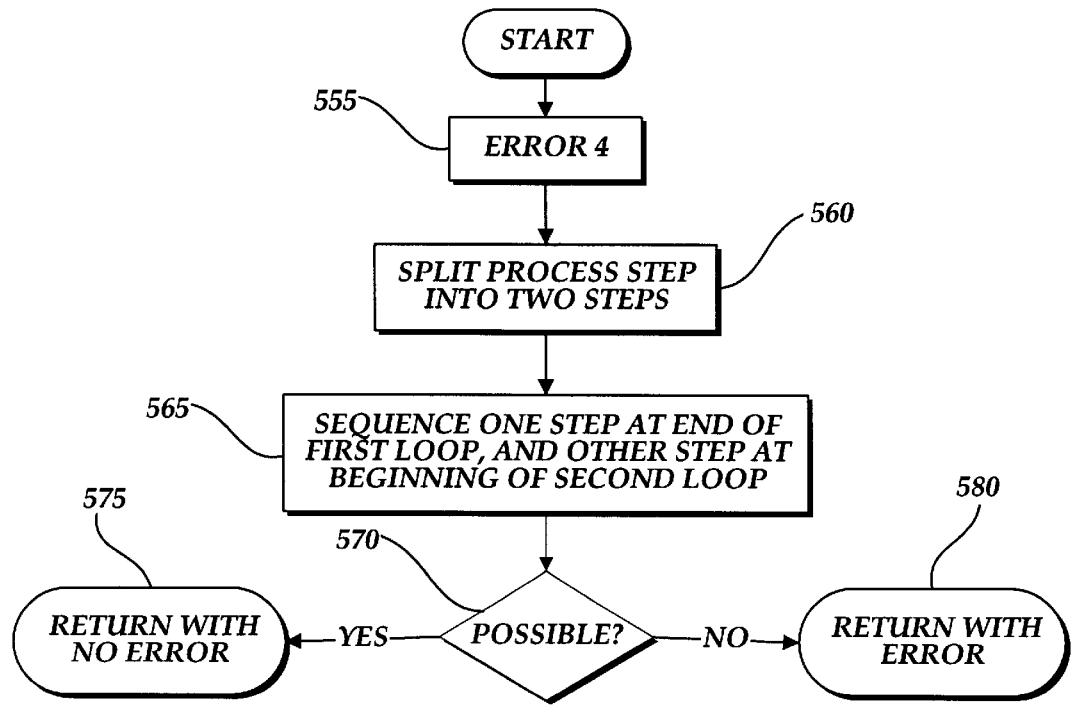

Referring to FIG. 7, first, at block 555, the user is informed that Error 4 has been detected. Then, at block 560, the process step involved in the connected iteration is then split into two steps. One step is sequenced at the end of the first loop and the other step is sequenced at the beginning of the second loop. See block 565. The connected iteration is then presented to the user, and it is left up to the user to split the high level process step into two steps.

If, at block 570, it was possible to split the process step into two steps, and resequence the two steps, processing returns with no error to block 328 in FIG. 3B. See block 575. If, on the other hand, the user was unable to do so, at block 580, processing is returned with an error to block 328 in FIG. 3B. Alternatively, the return with error could be to block 245 of FIG. 2A.

Figure 8:
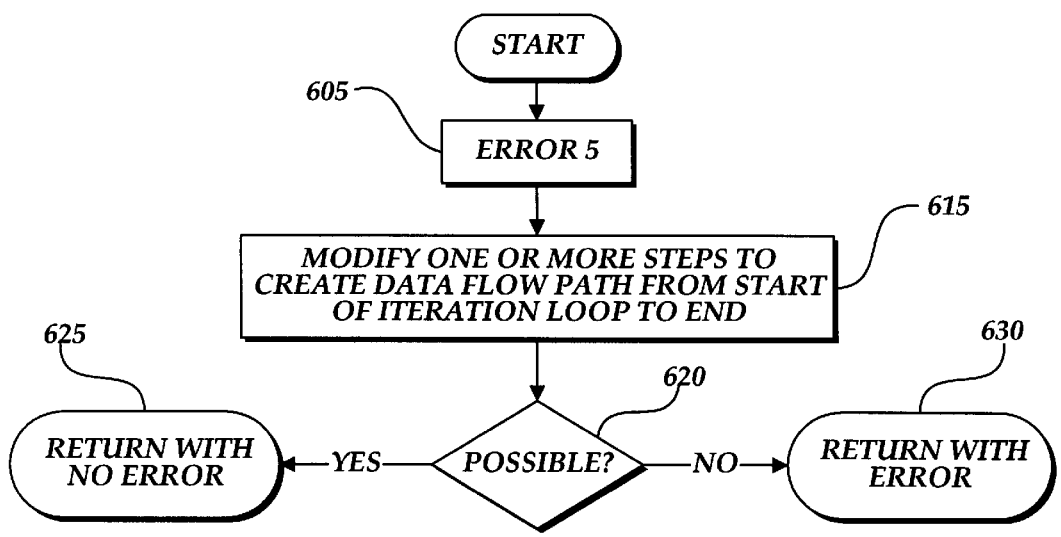

Returning to FIG. 3B, if, at block 326, no connected iteration was detected, or after a return from error correction processing at block 328, processing proceeds to block 330. At block 330, each step having data items in its INITIAL INPUTS list is analyzed for non-converging iteration. Non-converging iteration occurs when an iteration loop fails to pass any data from the start of the loop to the end of the loop. If the process step that initiates an iteration loop does not, by some means, convey data to the step which generates new data item values for the iteration, the iteration loop has no ability to converge. If non-converging iteration is detected at block 330, error correction processing depicted in FIG. 8 is initiated. See block 332.

Referring to FIG. 8, the user is informed that Error 5 has been detected. See block 605. Then, one or more steps are modified to create a data flow path from the beginning of the iteration loop to the end to either remove the iteration loop if one should not exist, or to modify the iteration loop such that it converges. See block 615. This is accomplished by the user either determining that the iteration loop should not exist, or adding data items to some steps, which will send data from the starting step to the ending step.

If, at step 620, it was possible to correct the non-converging iteration, processing is returned with no error to block 332 in FIG. 3B. See block 625. If, on the other hand, it was not possible to correct the non-converging iteration at block 630, processing is returned with an error to block 332 in FIG. 3B. Alternatively, the return with error could be to block 245 of FIG. 2A.

Returning to FIG. 3B, if at block 330, no non-converging iteration was detected or after a return from error correction processing at block 332, processing proceeds to block 334. At block 334, each process step which has a data item which is in both its OUTPUTS list and also in the INITIAL INPUTS list of another process step is analyzed for any inconsistent iteration. If a valid iteration relationship exists between two steps, as well as a normal output to input relationship, the relationship is inconsistent. This happens when step B generates data for initial inputs of step A as well as for inputs of step A. One case implies that step B should come after step A in the sequence and the other case implies the opposite. If, at block 334, an inconsistent iteration is detected, error correction processing depicted in FIG. 9 is initiated.

Figure 9:
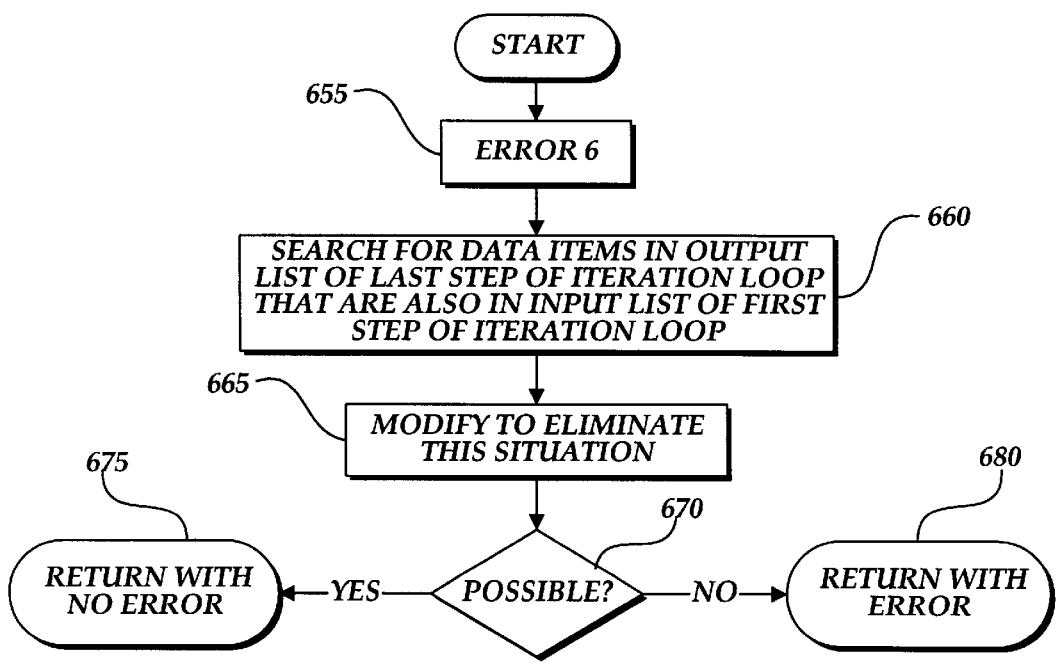

Referring to FIG. 9, the user is informed that Error 6 has been detected. See block 655. Next, at block 660, the OUTPUTS list of the last step of the iteration loop is analyzed to search for data items which are also in the INPUTS list of the first step of the iteration loop. At block 665, the data items which are common to the OUTPUTS list of the last step of the iteration loop and the INPUTS list of the first step of the iteration loop are presented to the user. If the established iteration data items are valid from the user's standpoint, it may be that the other items were simply overlooked. This can be remedied by changing them to initial inputs, i.e., by moving them to INITIAL INPUTS lists. If the user does not wish to make these data items into initial inputs, then the only choice is to eliminate them or eliminate the iteration.

If, at block 670, it was possible for the user to eliminate the inconsistent iteration, processing returns with no error to block 336 in FIG. 3B. See block 675. If, on the other hand, the user was unable to eliminate the inconsistent iteration, at block 680, processing is returned with an error to block 336 in FIG. 3B. Alternatively, the return with error could be to block 245 of FIG. 2A.

Returning to FIG. 3B, if, at block 334, no inconsistent iteration was detected, or after a return from error correction processing at block 336, processing proceeds to block 338. At block 338, each process step which has data items in its INITIAL INPUTS list is analyzed for incomplete iteration. During the building of a process, the user can end up with iteration specifications that are not totally consistent. A first type of incomplete iteration is where a data item may be specified as in initial input, but no process step generates the data item. A second type of incomplete iteration is when a data item may be specified as an initial output, but no step uses it as an initial input, nor does any step generate it as an output. If an incomplete iteration is detected, processing proceeds to the error correction processing depicted in FIG. 10.

Figure 10:
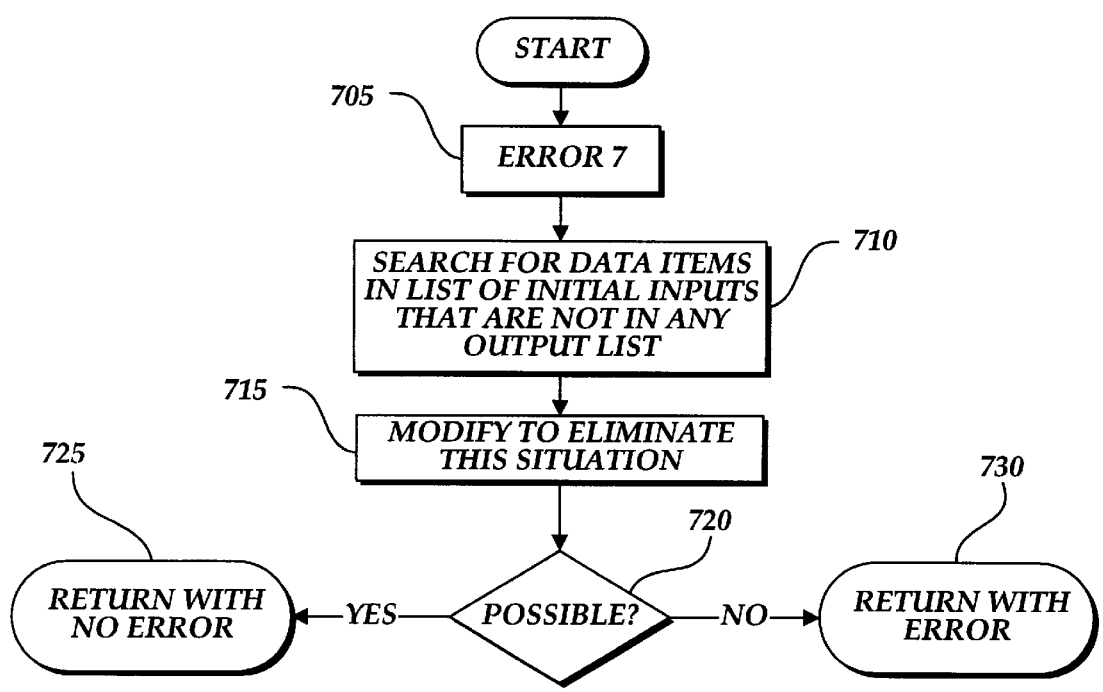

Referring to FIG. 10, the user is informed that Error 7 has been detected. See block 705. At block 710, addressing the first type of incomplete iteration, the INITIAL INPUTS list is searched for data items that do not appear in any OUTPUTS list. Incomplete iteration information is presented to the user to make modifications in order to eliminate the situation. See block 715. This may be done by the user selecting a process step as the generator for the data item and placing that data item in the OUTPUTS list of the selected process step. Additionally, to address the second type of incomplete iteration at block 710, the INITIAL OUTPUTS list is searched for any data items that do not appear in any INITIAL INPUTS list. This incomplete iteration information is presented to the user to make modifications to eliminate the situation. See block 715. This may be done by adding the data item to the INITIAL INPUTS list of another step, or by removing it from the INITIAL OUTPUTS list.

If, at block 720, it was possible for the user to make the necessary modifications, processing returns with no error to block 340 in FIG. 3B. See block 725. If, on the other hand, it was not possible for the user to eliminate the incomplete iteration, processing returns with an error to block 340 in FIG. 3B. See block 730. Alternatively, the return with error could be to block 245 of FIG. 2A.

Returning to FIG. 3B, if, at block 338, no incomplete iteration was detected, or after a Return from error correction processing at block 340, processing returns to block 245 in FIG. 2A. See block 342.

Returning to FIG. 2A, once all errors have been corrected at block 245, a final data-driven sequencing phase depicted in FIG. 2B is entered.

Referring to FIG. 2B, final sequencing is essentially the same as initial sequencing, except that Inconsistent Iteration errors have already been addressed. Final sequencing occurs as described for the trial data-driven sequencing phase described above, with the resulting sequence being the final data-driven sequence.

While the error processing has been described to process for Errors 1–7 shown in Table 1, other embodiments of the present invention may additionally or alternatively process for overlapping iterations and intersecting iterations (not shown).

An overlapping iteration is present when the start and end points of one iteration loop completely surround the start and end points of another loop. In other words, one loop is completely nested within the other loop. The primary problem with this situation is that the inside loop may be re-executed each time the outside loop is executed.

The user may control the schedule impact of overlapping iterations by specifying a weak or strong coupling between the loops. Weak coupling means that re-entering the inside loop will never cause it to iterate; strong coupling means that re-entering the inside loop will always cause it to iterate.

Intersecting iteration is present when the beginning of one iteration loop is inside a second iteration loop, but the end of the second loop is outside the first iteration loop. The primary problem with this situation is that the first loop may be re-executed each time the second loop is executed.

The user may control the schedule impact of intersecting iterations by specifying a weak or strong coupling between the loops. Weak coupling means that re-entering the first loop from the second loop will never cause it to iterate; strong coupling means that re-entering the first loop from the second will always cause it to iterate.

Overlapping iteration and intersecting iterations will not prevent data-driven sequencing, but should be considered because they may result in undesirable scheduling implications.

While the preferred embodiment of the invention has been illustrated and described, it will be appreciated that within the scope of the appended claims various changes can be made therein without departing from the spirit of the invention.

The embodiments of the invention in which an exclusive property or privilege is claimed are defined as follows:

1. A method for analyzing a sequence of process steps to determine whether the process steps can be re-sequenced as a data-driven process, the method comprising:

(a) analyzing each process step for pass-through data items;

(b) analyzing each data item output by a process step for redundant data generation;

(c) analyzing each combination of step pairs for tight-loop iteration;

(d) analyzing for implied iteration while creating a sequence of process steps;

(e) analyzing each process step in the sequence having initial input data items for connected iteration;

(f) analyzing each process step in the sequence having initial input data items for non-converging iteration;

(g) analyzing each process step in the sequence having output data items that are initial input data items to another process step for inconsistent iteration;

(h) analyzing each process step in the sequence having initial inputs for incomplete iteration; and (i) if no pass-through data items, redundant data generation, tightloop iteration, implied iteration, connected iteration, non-converging iteration, inconsistent iteration, or incomplete iteration are detected, indicating that the sequence of process steps can be re-sequenced as a data-driven process.

2. A method for creating a data-driven process from a plurality of process steps, each process step having associated lists of data items which are inputs, initial inputs, outputs, and initial outputs, the method comprising:

(a) analyzing each process step in the sequence to detect passthrough data items;

(b) analyzing each data item output by a process step to detect redundant data generation;

(c) analyzing each combination of step pairs to detect tight-loop iteration;

(d) analyzing each process step in the sequence having initial input data items to detect connected iteration;

(e) analyzing each process step in the sequence having initial input data items to detect non-converging iteration;

(f) analyzing each process step in the sequence having output data items that are initial input data items to another process step to detect inconsistent iteration;

(g) analyzing each process step in the sequence having initial inputs to detect incomplete iteration; and (h) modifying to eliminate all detected pass-through data items, redundant data generation, tight-loop iteration, connected iteration, non-converging iteration, inconsistent iteration, and incomplete iteration.

3. The method of claim 2, further comprising:

(a1) if a pass-through data item is detected, selecting the data item from one of the input list and the output list of the process step associated with the pass-through data item; and (a2) deleting the data item from the selected list.

4. The method of claim 2, further comprising:

(b1) if redundant data generation is detected, locating all process steps which generate the data item associated with redundant generation;

(b2) selecting a single process step as the generator for the data item; and (b3) deleting the data item from the output lists of all the other located process steps.

5. The method of claim 2, further comprising:

(c1) if tight-loop iteration is detected, selecting one process step of the process step pair associated with the tight-loop iteration to be scheduled before the other process step; and (c2) changing the data items which are inputs to the selected process step to data items which are initial inputs to the selected step.

6. The method of claim 2, further comprising:

(d1) if connected iteration is detected, splitting the process step associated with the connected iteration into two steps;

(d2) sequencing one step at the end of a first iteration loop; and (d3) sequencing the other substep at the beginning of a second iteration loop.

7. The method of claim 2, further comprising:

(e1) if non-converging iteration is detected, analyzing the process step associated with the non-converging iteration to select one or more process steps which will link the process step associated with the non-converging iteration to the last step of an iteration loop with which the process step associated with the non-converging iteration is associated; and (e2) modifying the selected process steps to create a data flow path from the beginning of the iteration loop to the end to modify the iteration loop such that it converges.

8. The method of claim 2, further comprising:

(f1) if inconsistent iteration is detected, analyzing all data items which are outputs of process steps associated with the inconsistent iteration loop to locate data items which are also inputs to a first process step of the inconsistent iteration loop; and (f2) changing the data items located data items from inputs for the first process step of the inconsistent iteration loop to initial inputs.

9. The method of claim 2, further comprising:

(g1) if incomplete iteration is detected, analyzing all data items which are initial inputs to detect those data items which are not generated by any process step;

(g2) selecting a process step to generate each detected data items; and (g3) adding the detected data items to the outputs lists associated with the selected process steps.

10. A method for creating a data-driven process from a plurality of process steps, the method comprising:

(a) creating a first list comprising all process steps to be sequenced;

(b) processing the first list to correct for errors which would prevent data-driven sequencing;

(c) adding to a second list all data items which are an input to a process step, but are not output by any process step in the first list;

(d) adding to a third list all process steps in the first list for which all input data items are in the second list;

(e) moving all process steps from the third list to a sequenced list as concurrent steps;

(f) adding all data items which are outputs or initial inputs of the concurrent steps to the second list;

(g) deleting the concurrent steps from the first list; and (h) repeating (d) through (g) until the first list is empty.

11. The method of claim 10, wherein creating a first list comprises:

(a1) collecting all process steps to be sequenced for data-driven processing;

(a2) creating, for each process step to be sequenced:
(1) a list of data items which are inputs to the process step;
(2) a list of data items which are used by the process step as initial values in an iteration loop;
(3) a list of data items which are generated by the process step; and
(4) a list of data items which are created by the process step and used by other process steps as initial inputs; and (a3) storing the collected process steps as a first list.

12. The method of claim 11, wherein each list of data items comprises a list of names of data items.

13. The method of claim 10, wherein processing the list to correct for errors which would prevent data-driven sequencing comprises:

(b1) analyzing each process step in the sequence for pass-through data items;

(b2) analyzing each data item output by a process step for redundant data generation;

(b3) analyzing each combination of step pairs for tight-loop iteration;

(b4) analyzing each process step in the sequence having initial input data items for connected iteration;

(b5) analyzing each process step in the sequence having initial input data items for non-converging iteration;

(b6) analyzing each process step in the sequence having output data items that are initial input data items to another process step for inconsistent iteration; and (b7) analyzing each process step in the sequence having initial inputs for incomplete iteration.

14. A method for creating a data-driven process from a plurality of process steps, the method comprising:

(a) creating a first list comprising all process steps to be sequenced, wherein an INPUTS list, an INITIAL INPUTS list, an OUTPUTS list, and an INITIAL OUTPUTS list is created for each process step;

(b) analyzing process steps of the first list and the INPUTS lists, INITIAL INPUTS lists, OUTPUTS lists, and INITIAL OUTPUTS lists of the process steps for errors which would prevent data-driven sequencing;

(c) correcting for errors which would prevent data-driven sequencing;

(d) adding to a second list, all data items which are an input to a process step, but are not output by any process step in the first list;

(e) adding to a third list, all process steps in the first list for which all input data items are in the second list;

(f) moving all process steps from the third list to a sequenced list as steps which may be performed in parallel;

(g) adding all data items which are outputs or initial inputs of the steps which may be performed in parallel to the second list;

(h) deleting the steps which may be performed in parallel from the first list; and (i) repeating (e) through (h) until the first list is empty.

15. The method of claim 14, wherein analyzing for errors comprises:

(b1) analyzing each process step in the sequence for pass-through data items;

(b2) analyzing each data item output by a process step for redundant data generation; and (b3) analyzing each combination of step pairs for tight-loop iteration.

16. The method of claim 14, wherein analyzing for errors comprises:

(b1) analyzing each process step in the sequence having initial input data items for connected iteration;

(b2) analyzing each process step in the sequence having initial input data items for non-converging iteration;

(b3) analyzing each process step in the sequence having output data items that are initial input data items to another process step for inconsistent iteration; and (b4) analyzing each process step in the sequence having initial inputs for incomplete iteration.

17. A method for creating a data-driven process from a plurality of process steps, each process step having associated lists of data items which are inputs, initial inputs, outputs, and initial outputs, the method comprising:

(a) analyzing each process step to detect pass-through data items;

(b) analyzing each data item output by a process step to detect redundant data generation;

(c) analyzing each combination of step pairs to detect tight-loop iteration;

(d) creating a data-driven sequence and concurrently analyzing for implied iteration;

(e) modifying to eliminate all detected implied iteration;

(f) analyzing each process step in the sequence having initial input data items to detect connected iteration;

(g) analyzing each process step in the sequence having initial input data items to detect non-converging iteration;

(h) analyzing each process step in the sequence having output data items that are initial input data items to another process step to detect inconsistent iteration;

(i) analyzing each process step in the sequence having initial inputs to detect incomplete iteration; and (j) modifying to eliminate all detected pass-through data items, redundant data generation, tight-loop iteration, connected iteration, non-converging iteration, inconsistent iteration, and incomplete iteration.

\* \* \* \* \*